United States Patent
Megiddo

(10) Patent No.: US 6,559,863 B1
(45) Date of Patent: May 6, 2003

(54) SYSTEM AND METHODOLOGY FOR VIDEO CONFERENCING AND INTERNET CHATTING IN A COCKTAIL PARTY STYLE

(75) Inventor: Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/503,044

(22) Filed: Feb. 11, 2000

(51) Int. Cl.⁷ .................................................. G09G 5/00
(52) U.S. Cl. ........................ 345/753; 345/756; 345/757; 345/758; 345/850; 348/14.08; 709/204
(58) Field of Search ............................... 345/758, 753, 345/757, 751, 711, 808, 809, 800, 782, 802, 850; 709/204; 348/14.08; 379/202.01

(56) References Cited

U.S. PATENT DOCUMENTS

| | | | | |
|---|---|---|---|---|
| 5,347,306 A | * | 9/1994 | Nitta .......................... 345/473 |
| 5,794,006 A | | 8/1998 | Sanderman |
| 5,828,839 A | | 10/1998 | Moncreiff |
| 5,835,094 A | * | 11/1998 | Ermel et al. ................ 345/419 |
| 5,889,843 A | * | 3/1999 | Singer et al. ............... 370/266 |
| 5,933,599 A | | 8/1999 | Nolan |
| 5,941,947 A | | 8/1999 | Brown et al. |
| 5,956,491 A | | 9/1999 | Marks |
| 5,995,101 A | * | 11/1999 | Clark et al. ................. 345/711 |
| 5,999,208 A | * | 12/1999 | McNerney et al. ......... 345/757 |
| 6,175,842 B1 | * | 1/2001 | Kirk et al. ................... 345/419 |
| 6,219,045 B1 | * | 4/2001 | Leahy et al. ................ 345/757 |
| 6,327,567 B1 | * | 12/2001 | Willehadson et al. ....... 704/231 |
| 6,330,022 B1 | * | 12/2001 | Seligmann ............... 348/14.08 |

* cited by examiner

Primary Examiner—Kristine Kincaid
Assistant Examiner—Sajeda Muhebbullah
(74) Attorney, Agent, or Firm—Amin Eschwiler & Turocy LLP; March D. McSwain

(57) ABSTRACT

A system and method is provided that allows participants in an electronic conference room to move to any spatial location in the electronic conference room by simply clicking and dragging, using a computer mouse, a graphical image representing the participant to any location in the electronic conference room. This allows participants to form small groups for communicating similar to a cocktail party situation. A communication media allows participants to communicate with one another within their particular groups. The participants can communicate though the graphical images either visually, audibly or both visually and audibly. Each user is provided visually with captions of other groups, which is reduced in size depending on the distance that particular group is from the user's location within the electronic conference room. In addition, each main user is provided with audible signals from other groups, which is attenuated based on the distance that particular group is from the user's location within the electronic conference room.

5 Claims, 9 Drawing Sheets

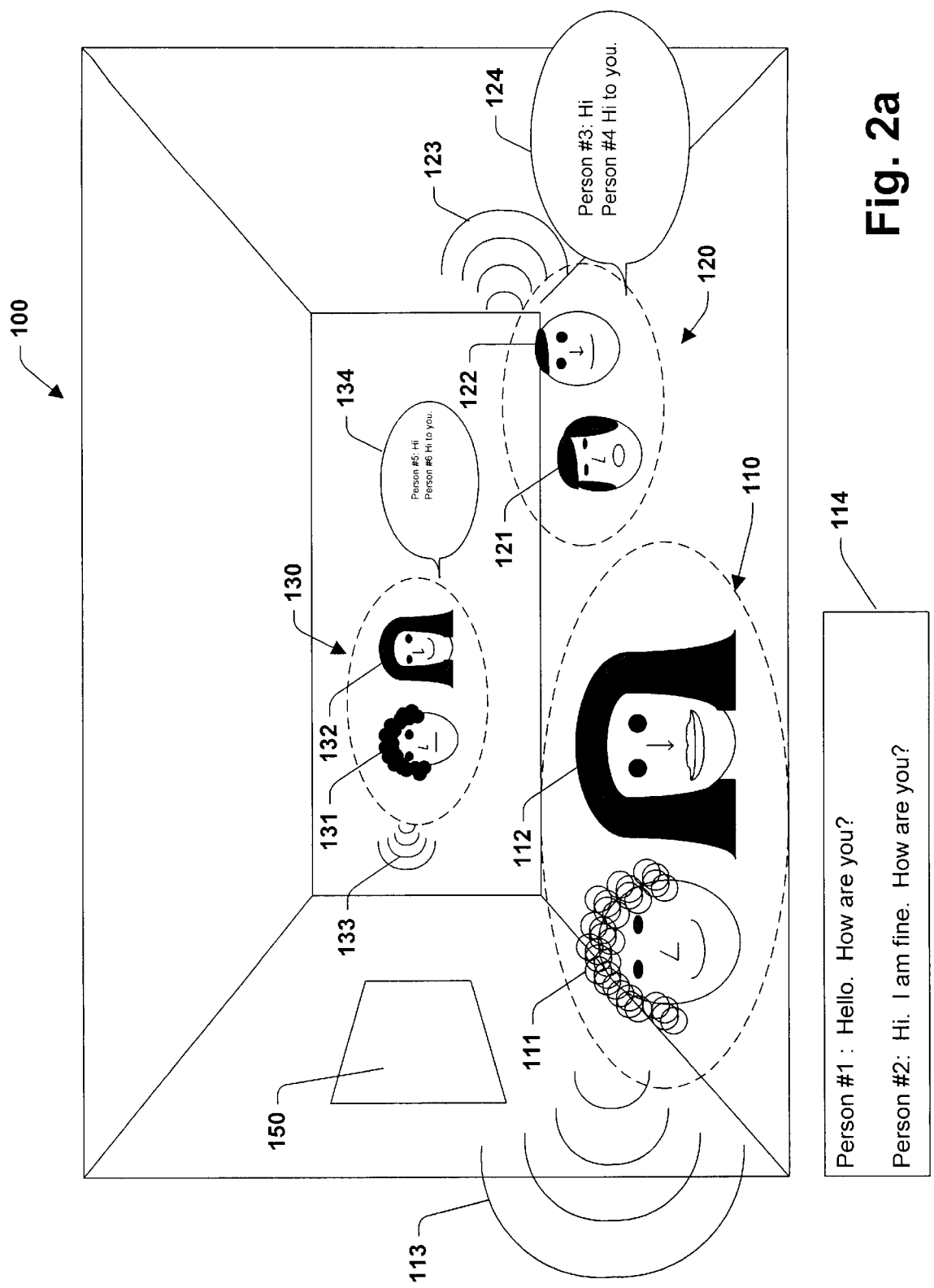

SYSTEM AND METHODOLOGY FOR VIDEO CONFERENCING AND INTERNET CHATTING IN A COCKTAIL PARTY STYLE

TECHNICAL FIELD

The present invention relates to an electronic conference room, and more particularly to an improved system and method for interactive communication in an electronic conference room.

BACKGROUND OF THE INVENTION

Recently developed Internet technology allows video conferencing through the Internet. Video conferencing typically allows for participants to talk and be heard by other participants in the conference. However, when there is a large number of participants in a video conference only a few of the participants can be heard at a time. In addition, chat rooms have been available for some time that allow individuals to communicate with one another through text boxes. The problem with chat rooms using text boxes is that all participants can type in text at any time and streams of conversation get interlaced. Furthermore, it is difficult to track the conversation and also the participants that are listening.

Accordingly, there is a strong need in the art for a system and method for electronically communicating interactively with multiple participants that overcomes some of the aforementioned disadvantages of conventional chat rooms and/or video conferencing systems.

SUMMARY OF THE INVENTION

The present invention addresses weaknesses of conventional video conferencing and chat rooms, via enablement of cocktail party type interaction. A graphical user interface is provided that allows a user to select a location in an electronic conference room where the user would like to be spatially located. The graphical user interface provides each participant in the conference room with a graphical image representation thereof. The graphical image can be an icon representing the participant, a photograph or picture representing the participant, a real-time video picture provided by a camera connected to the participant's personal computer or other suitable graphical representation. According to one aspect of the present invention, a system and method is provided that allows participants in the electronic conference room to spatially move to any location in the electronic conference room by simply clicking and dragging (e.g., using a computer mouse) a graphical image representing the participant to a location in the electronic conference room. Additionally, participants can move about the electronic conference room via a virtual reality system. The present invention also allows users to move to locations on the floor that are vacant to start a new group.

The present invention allows for a first user to be spatially represented by a first iconic representation within the electronic conference room. Intensity of communications from iconic representations of other users employing the electronic conference room vary as a function spatial location relative to the first iconic representation. Therefore, if a second user's iconic representation is a distance x from the first user, and a third user's iconic representation is a distance 3x from the first user, the intensity of communications from the second user will be greater than the intensity of communications from the third user. Accordingly, the present invention facilitates creating a cocktail party type interaction medium wherein communications between parties spatially closer to a first user are more intense (louder and/or larger text) than communications between parties further away from the first user. Thus, the present invention allows for the first user to engage in a conversation with one or more people while concurrently being able to eavesdrop on conversations of one or more other parties.

Each participant is considered a main user with respect to attributes of the system on the user's personal computer. Preferably, the graphical image and the members of the user's group will appear closer on the user's computer screen than other participants in the electronic conference room, regardless of location of the user in the electronic conference room. Dynamically rotating or re-orienting the electronic conference room with respect to the location of the user, such that the electronic conference room is viewed with reference to the location of the user on the user's computer screen. The number of participants in the electronic conference room is limited by the physical space on the electronic conference room floor. This keeps the number in each group small.

In a preferred aspect of the invention, the system is provided with a communication media to allow participants to communicate with one another within their particular groups. The participants can communicate though graphical images visually and/or audibly. The system provides captions with text for communicating visually within each group. The main user is provided with captions of other groups, which are reduced in size depending on the distance that particular group is from the user's location within the electronic conference room. In addition, the main user is provided with audible signals from other groups, which are attenuated based on the distance that particular group is from the user's location within the electronic conference room. This background communication provides the user with information in deciding whether or not to enter another group that may be of interest to the user. The user can turn on and off selectively background communications from other groups with respect to the user's computer and personal environment. The user can also control their own communication within the group. For example, the user can select between communicating visually, audibly or simply listening to others.

Thus, according to one aspect of the present invention an electronic communications medium is provided. The electronic communications medium includes a first user spatially represented within the medium by a first graphical indicia and a second user spatially represented within the medium by a second graphical indicia. The second graphical indicia is spatially located at a distance x from the first graphical indicia. A third user is spatially represented within the medium by a third graphical indicia. The third graphical indicia is spatially located at a distance z from the first graphical indicia, z being greater than x. The intensity of communication by at least one of the second and third user is a function of the spatial distance of the second or third graphical indicia, respectively, from the first graphical indicia.

According to another aspect of the present invention, a system for providing an electronic forum for allowing multiple users to communicate simultaneously with one another is provided. The system includes a system interface and a plurality of computers coupled to the system interface. The system interface provides each user of each of the plurality of computers with an electronic conference room for communicating with one another. Each user is represented by a graphical indicia in the electronic conference room.

In accordance with another aspect of the present invention, a method is provided for allowing multiple users to communicate electronically with one another. The method includes the steps of providing an electronic conference room adapted to allow a plurality of computers to be coupled thereto, providing a plurality of graphical images representing users of the plurality of computers, allowing each user of the system to move their respective image to different locations within the electronic conference room to form small groups, providing each user with a communication medium for communicating with others within their respective group and providing each user with the ability to receive background communication at a reduced level from other groups.

In accordance with yet another aspect of the present invention, an electronic conference room is provided. The electronic conference room includes an interface system adapted to be employed by multiple users for establishing communication with one another. The interface system further provides each user with a graphical image representing the user and allows the user to move the graphical image to different locations within the electronic conference room, so as to form small communication groups. The electronic conference room also includes a communication medium adapted to provide each user with the ability to communicate with other users within their respective communication group.

In accordance with yet another aspect of the present invention an electronic signal is provided that is adapted to be transmitted between at least two computers. The electronic signal includes an algorithm for providing an electronic conference room. The electronic conference room provides users of the at least two computers with graphical images representing the users and allows the users to move the graphical images around the electronic conference room to form small groups. The electronic conference room also provides users with a communication medium for communicating with other users within their respective small groups.

In accordance with yet another aspect of the present invention a system is provided for providing an electronic forum for allowing multiple users to communicate simultaneously with one another. The system includes means for providing an interface, a plurality of computers coupled to the means for providing an interface, means for providing each user of each of the plurality of computers with a graphic image in the electronic conference room representing the user, means for allowing each user to move their respective graphic image to form small groups with other users and means for communicating with other users within the group.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

BRIEF DESCRIPTION OF THE DRAWINGS

FIG. 2a illustrates an electronic conference room in accordance with one aspect of the present invention;

DETAILED DESCRIPTION OF THE INVENTION

Figure 1A:
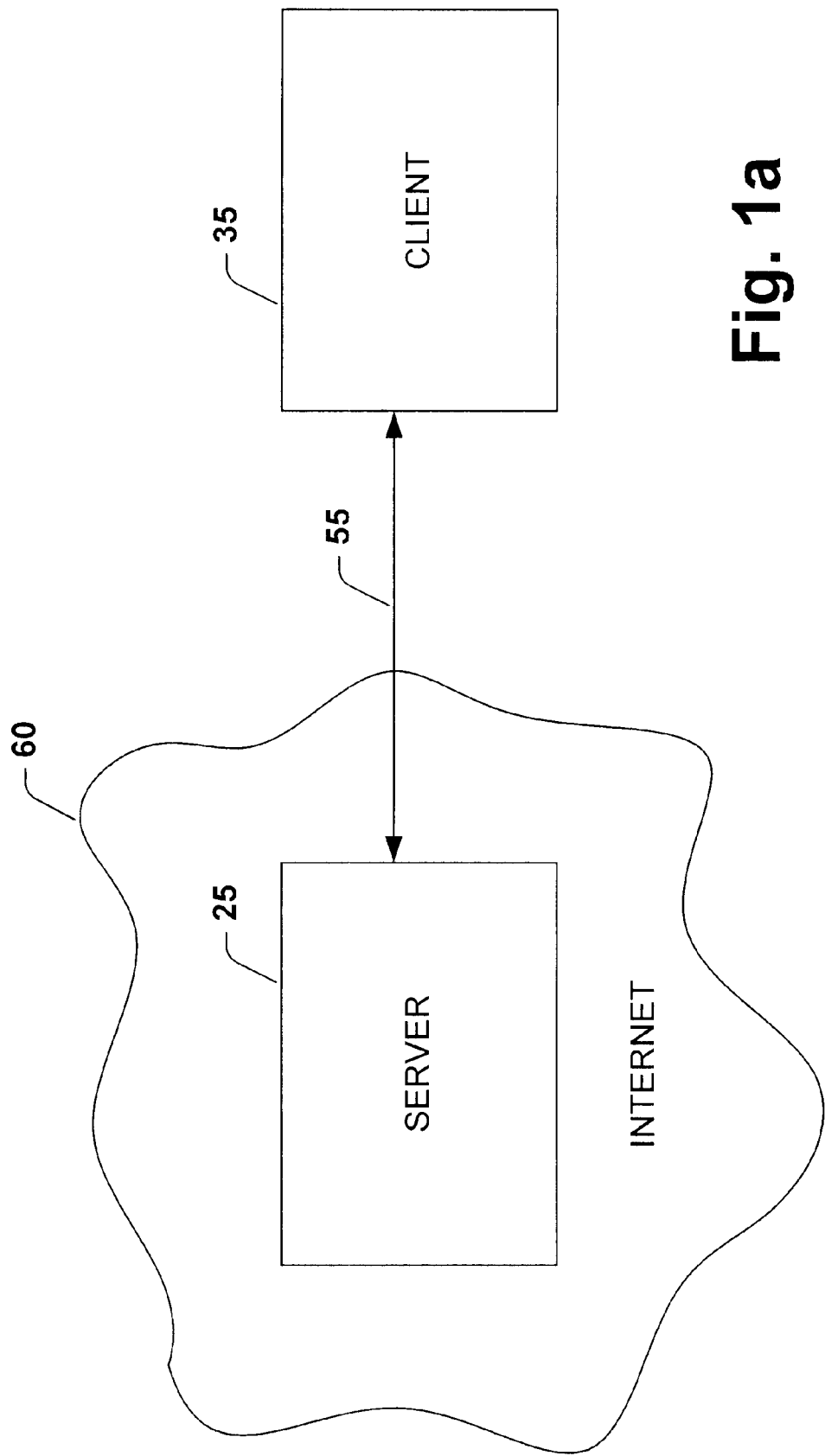
FIG. 1a is a schematic illustration of a client computer operatively coupled to a server computer system in accordance with one aspect of the present invention.

The present invention is now described with reference to the drawings, wherein like reference numerals are used to refer to like elements throughout. The present invention is described with reference to a system and method for providing an electronic forum for allowing multiple users to concurrently communicate with one another. The term electronic forum refers to technologies such as video conferencing and electronic chat rooms and is meant to include virtual reality systems. It is to be understood that the description of these embodiments are merely illustrative and that they should not be taken in a limiting sense.

Referring to FIG. 1a, a schematic block diagram depicting an environment of interest to a preferred embodiment of the present invention. The client computer system 35 is shown connected to the central server computer system 25 that is part of the Internet 60. The client computer system 35 and server 25 are connected via an Internet connection 55 using a public switched phone network, for example, such as those provided by a local or regional telephone operating company. The Internet connection 55 may also be provided by dedicated data lines, Personal Communication Systems ("PCS"), microwave, or satellite networks, for example, or any suitable means. It is to be understood that the terms client and server are to be construed in the broadest sense, and that all such constructions of the terms are intended to fall within the scope of the hereto appended claims.

Figure 1B:
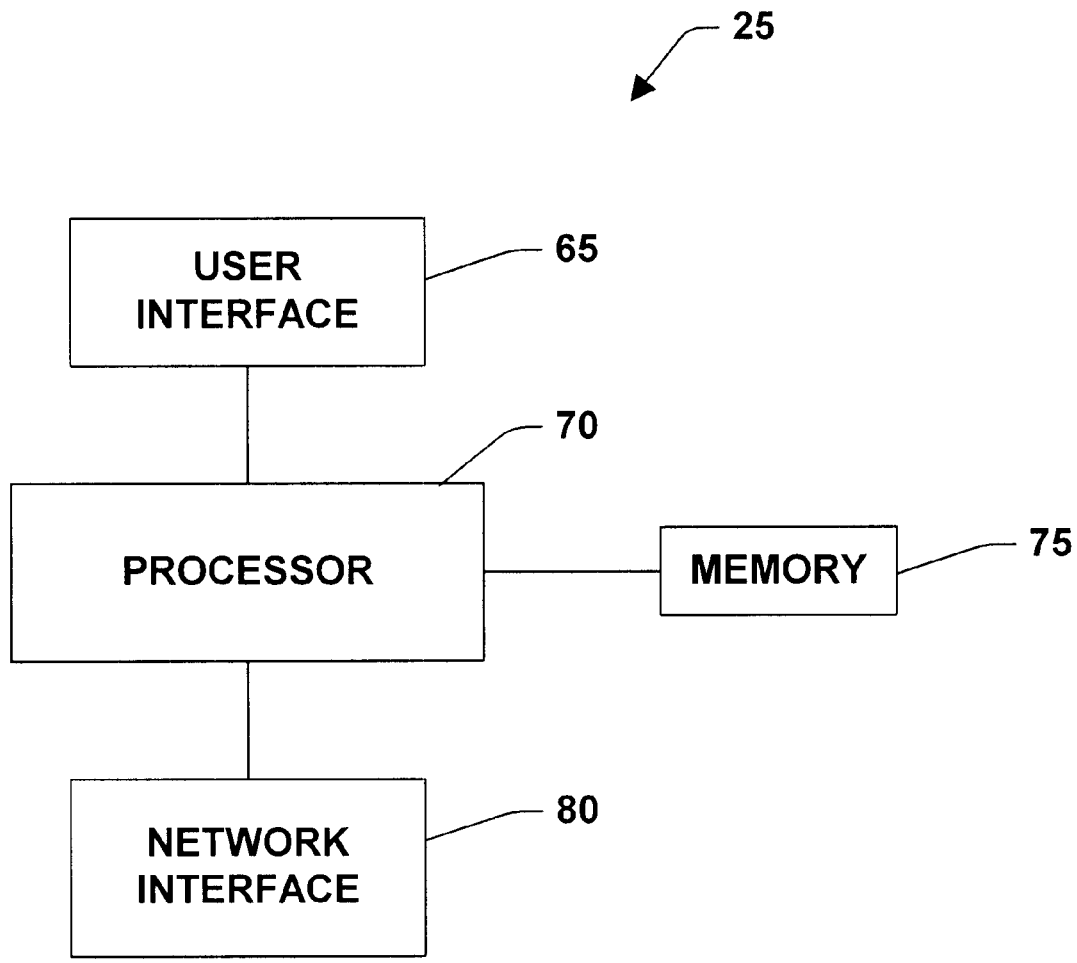
FIG. 1b illustrates a block diagram of a server computer in accordance with one aspect of the present invention.

Turning now to FIG. 1b, a block diagram of the hardware components of the server 25 is shown. In particular, the server 25 includes a central processor 70 for performing various functions described herein. A memory 75 is coupled to the processor 70 and stores operating code and other data associated with the operations of the server 25. A user interface 65 is also coupled to the processor 70 and provides an interface through which the server 25 may be directly programmed or accessed. The user interface 65, for example, may be an alphanumeric keyboard and mouse. A network interface 80 coupled to the processor 70 provides multiple connections for transceiving information with various Internet sites over network cables (not shown).

Figure 1C:
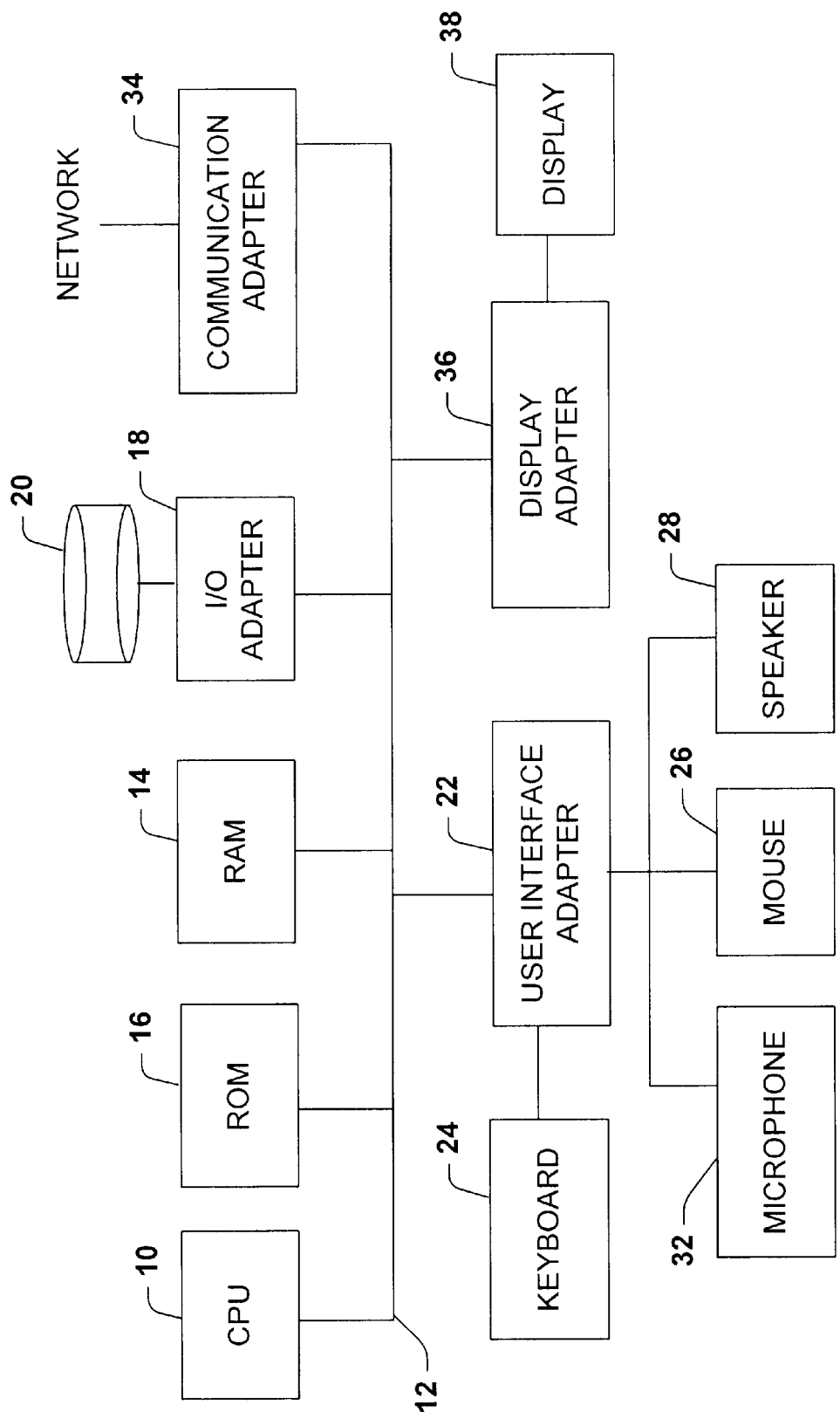
FIG. 1c illustrates a block schematic diagram of a client computer system in accordance with the present invention.

The present invention is preferably practiced in the context of a personal computer (PC) such as an IBM, Apple Macintosh or UNIX based computer. A representative hardware environment is depicted in FIG. 1c, which illustrates a typical hardware configuration of a client computer 35, such as a workstation or PC. The client computer 35 includes a central processing unit 10, such as a microprocessor, and a number of other units interconnected via a system bus 12. The client computer 35 shown in FIG. 1c includes a Random Access Memory (RAM) 14, Read Only Memory (ROM) 16 an I/O adapter 18 for connecting peripheral devices such as disk storage units 20 to the bus 12, a user interface adapter 22 for connecting a keyboard 24, a mouse 26, a speaker 28, a microphone 32, and/or other user interface devices such as a touch screen (not shown) to the bus 12, communication adapter 34 for connecting the workstation to a communication network (e.g. a data processing network) and a display adapter 36 for connecting the bus 12 to a display device 38. The client computer 35 typically has resident thereon an operating system such as Microsoft Windows Operating System (OS), the IBM OS/2 operating system, the MAC OS, or UNIX operating system.

FIG. 2a illustrates an electronic conference room 100 including a number of small groups of graphic images representing participants communicating with one another in the electronic conference room 100. The conference room 100 can be a video conference room or an Internet chat room, for example. The first group 110 includes a first graphic image 111 (hereinafter referred to as "the user 111") communicating with a second graphic image 112. A general cell area is illustrated by dashed lines for illustrative purposes only and is not meant to indicate any limitation of movement with respect to any graphic image in the electronic conference room 100. The user 111 and the second graphic image 112 can communicate using visual and/or audio communications via conventional computer system methods. In the present example, the user 111 and the second graphic image 112 are communicating using both visual and audio techniques. An audio signal 113 is provided that is louder than the audio signals generated from other groups in the conference room 100. In addition, a caption box 114 is provided that is larger than other caption boxes in the conference room 100. The user 111 and the second graphic image 112 appear as icon images representing the first and the second participant. However, the participants may be represented by actual scanned pictures of individual participants or actual video pictures of the participants via a camera connected to each of the participant's personal computer. This allows for graphic images to interact not only based on interest of their conversations, but also based on appearance.

A second group 120 appears behind and on the opposite side of the electronic conference room 100 with respect to the first group 110. The second group 120 includes a third graphic image 121 and a fourth graphic image 122. The third graphic image 121 and the fourth graphic image 122 are communicating with one another using both video and audio techniques. A caption 124 provides visual communication and an audio signal 123 provides audible communication. The user 111 is provided with background communication and can overhear and visual see the communications occurring between the third graphic image 121 and the fourth graphic image 122. However, the audio signal 123 between the graphic images in the second group is attenuated with respect to the audio signal 113 between the graphic images in the first group 110. This attenuation allows the user 111 to overhear conversation between the graphic images in the second group 120 without inundating the conversation that the user 111 is having with the second graphic image 112. In addition, the caption box 124 appears smaller than the caption box 114, so as not to limit the importance of the conversation that the user 111 is currently engaged.

A third group 130 appears behind the first group 110 farther away from the first group 110 than the second group 120. The third group 130 includes a fifth graphic image 131 and a sixth graphic image 132. The fifth graphic image 131 and the sixth graphic image 132 are communicating with one another using both video and audio techniques. A caption 134 provides visual communication and an audio signal 133 provides audible communication. The user 111 can overhear and visually see communications occurring between the fifth graphic image 131 and the sixth graphic image 132. Again, the audio signal 133 is attenuated and the caption 134 appears smaller than the caption 114. Furthermore, the audio signal 133 is attenuated even more than the audio signal 123 and the caption 134 appears even smaller than the caption 124, such that the overall appearance is one that simulates a real world cocktail party situation.

A picture 150 appears on a wall in the electronic conference room 100. The picture will be used as a reference to determine the location of the user 111 within the electronic conference room 100. The present invention allows for the user 111 to move around the electronic conference room 100 from group to group by simply clicking and dragging (e.g., using a computer mouse) the icon representing the user 111 to another spatial location within the electronic conference room 100. The electronic conference room 100 will rotate as the user 111 moves around the conference room 100, such that the user 111 and members of the user's group will appear to be closer on the user's computer screen than other groups in the electronic conference room 100.

Figure 2B:
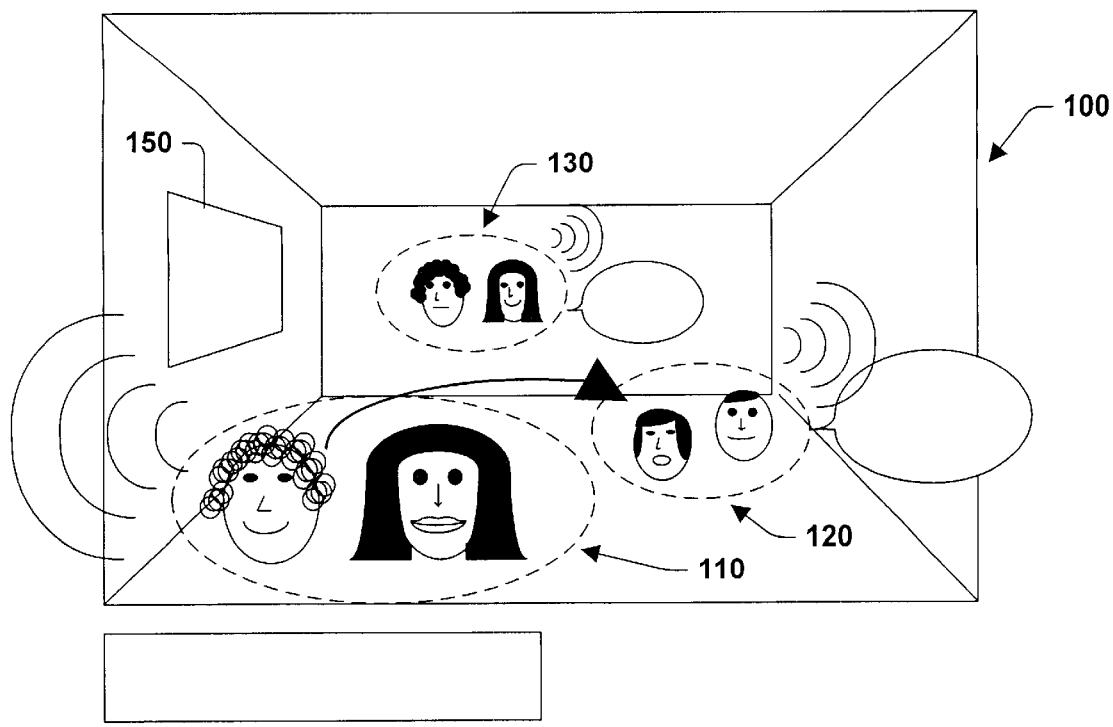
FIGS. 2b–2c illustrate movement of a graphical image within the electronic conference room of FIG. 2a in accordance with one aspect of the present invention.
Figure 2C:
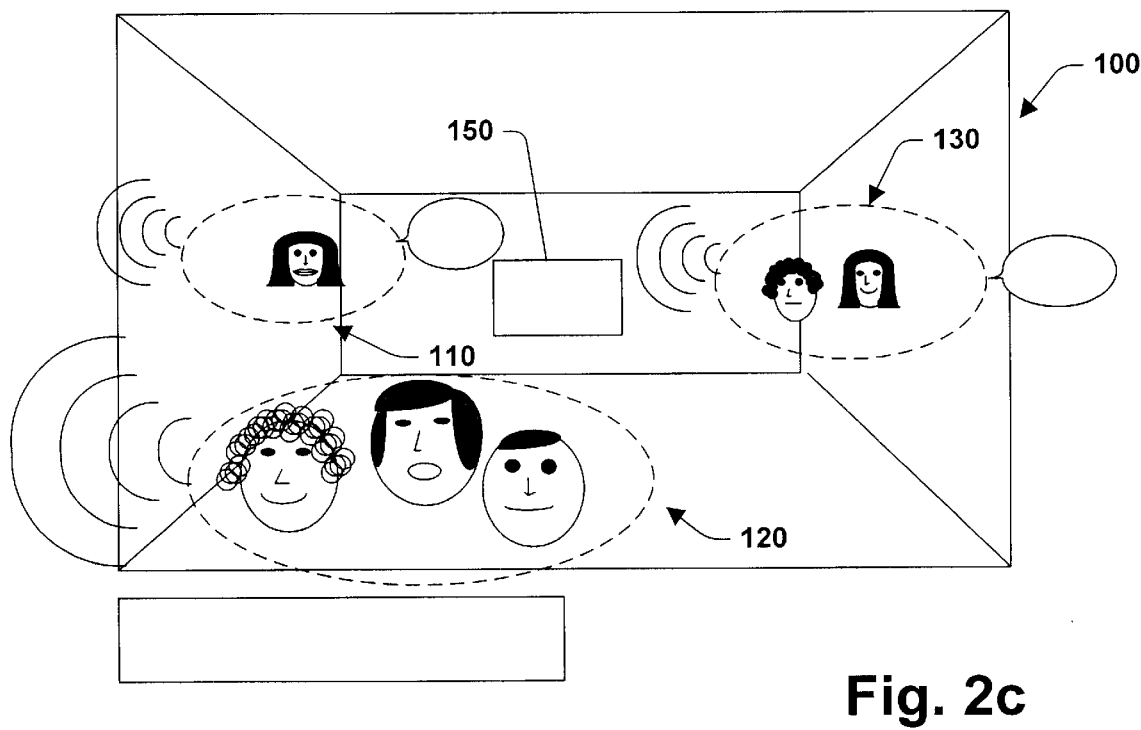

Referring to FIGS. 2b–2c, the user 111 decides to enter the second group 120. The user may choose to enter the group 120 because the user 111 overhears a conversation of interest to the user 111, or sees a participant that the user would like to meet due to appearance or simply because the user has tired of the conversation with the second graphic image 112. The user 111 clicks and drags, using a computer mouse, the icon representing the user 111 into or near to the second group 120. As can be seen in FIG. 2c, the user 111 then enters the second group 120 and the electronic conference room 100 rotates, so that the icon of the user 111 appears to be the closest icon of all the icons representing the participants. It is to be appreciated that each participant will become the user with respect to the representation of the icon representing them in the electronic conference room 100 during a conferencing session. Therefore, the icon, the picture or video image will appear closest in the electronic conference room 100 to that particular participant. In addition, the audio signal and the caption for each of the graphic images will be loudest and largest, respectively, in the group that the participant is a part. The picture 150 illustrates that the electronic conference room 100 has rotated so that the second group 120 now appears closest. The group 120 is illustrated as being in the middle of the electronic conference room 100 in FIG. 2b. In FIG. 2c, the first group 110 and the third group 130 now appear to be approximately the same distance from the second group 120.

Therefore, the position of the groups within the electronic conference room has not changed, but only the appearance of the user within the electronic conference room 100. It is to be appreciated that other graphic images may move from group to group within the electronic conference room 100, but the icon image of the user 111 will appear to be closer on the user's computer screen than the other groups that the user 111 is not participating.

Figure 3A:
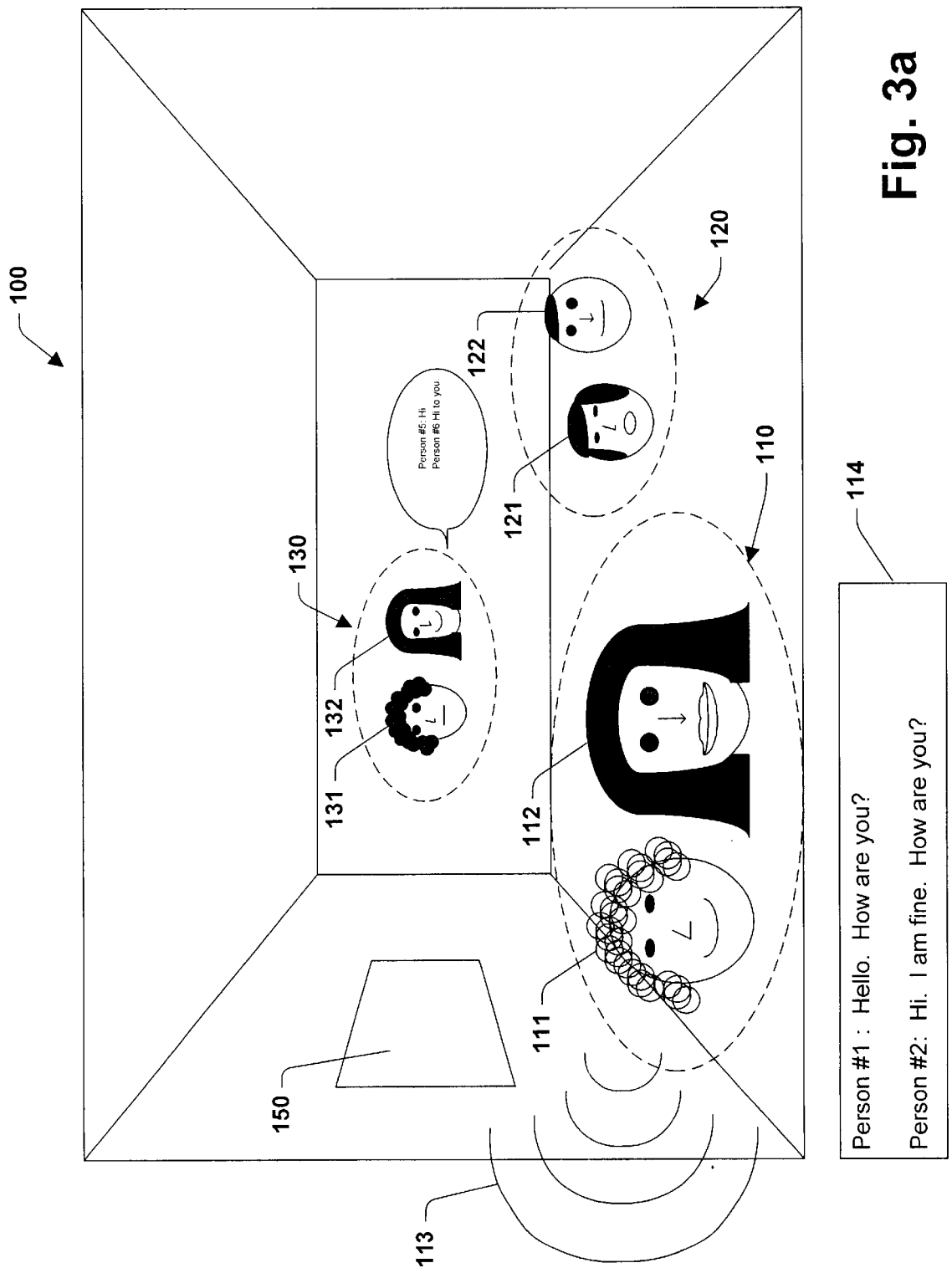
FIG. 3a illustrates the turning off of certain portions of background communication within the electronic conference room of FIG. 2a in accordance with one aspect of the present invention.
Figure 3B:
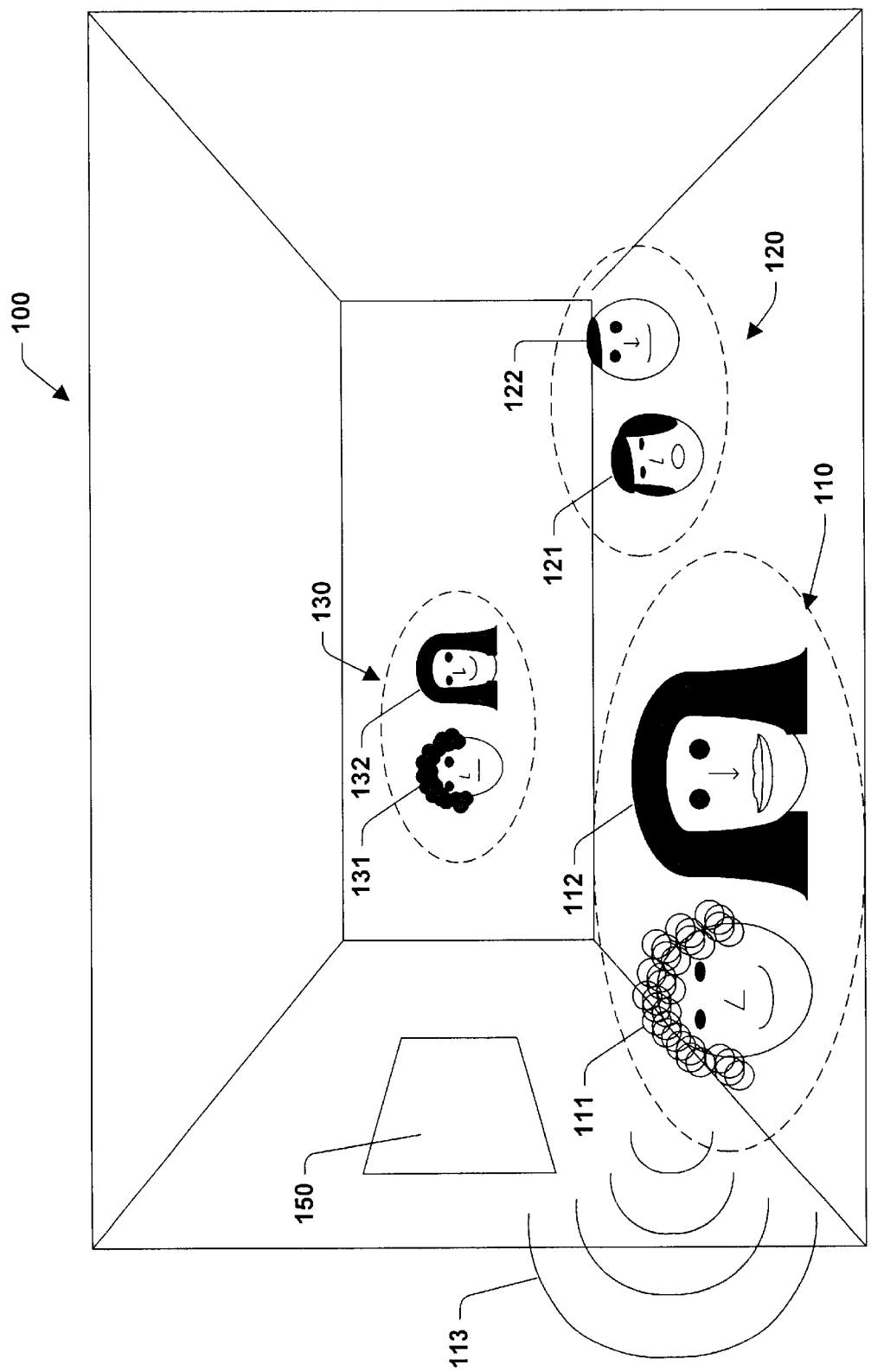
FIG. 3b illustrates the turning off of certain portions of communication medium within the user's group in the electronic conference room of FIG. 2a in accordance with one aspect of the present invention.

FIGS. 3a–3b illustrate another aspect of the invention where a user of the system can control not only audio and visual communication of the group of which the user is a member, but also the audio and visual communication of other groups. The user 111 can turn off the audio signal of a group by clicking with the computer mouse of the user's computer on the graphical image representing the audio signal. The user can turn off the visual communication by clicking on the caption with the computer mouse of the user's computer. The user can turn on the audio signals and caption by clicking the mouse in the general area to the left of the group for audio and to the right of the group for visual. For example, the user has turned off the visual and the audio communication of the second group 120 and the audio communication of the third group 130 in FIG. 3a. The user of the system will be able to control the background environment during a communication session with the second graphic image 112. In FIG. 3b, the user has turn all background communication off for both the second group 120 and the third group 130. The user 111 has also turned off the caption 114 and is communicating with the second graphic image 112 audibly only.

Figure 4A:
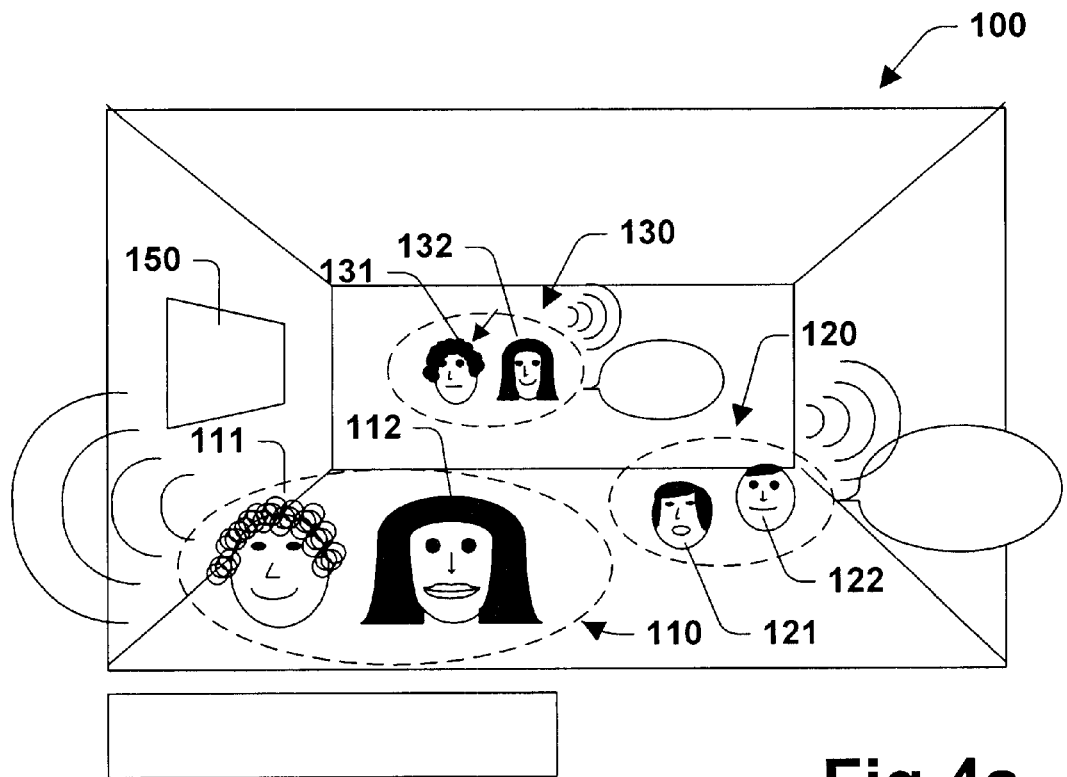
FIG. 4a illustrates a user moving the mouse pointer over a graphical image within the electronic conference room of FIG. 2a in accordance with one aspect of the present invention.
Figure 4B:
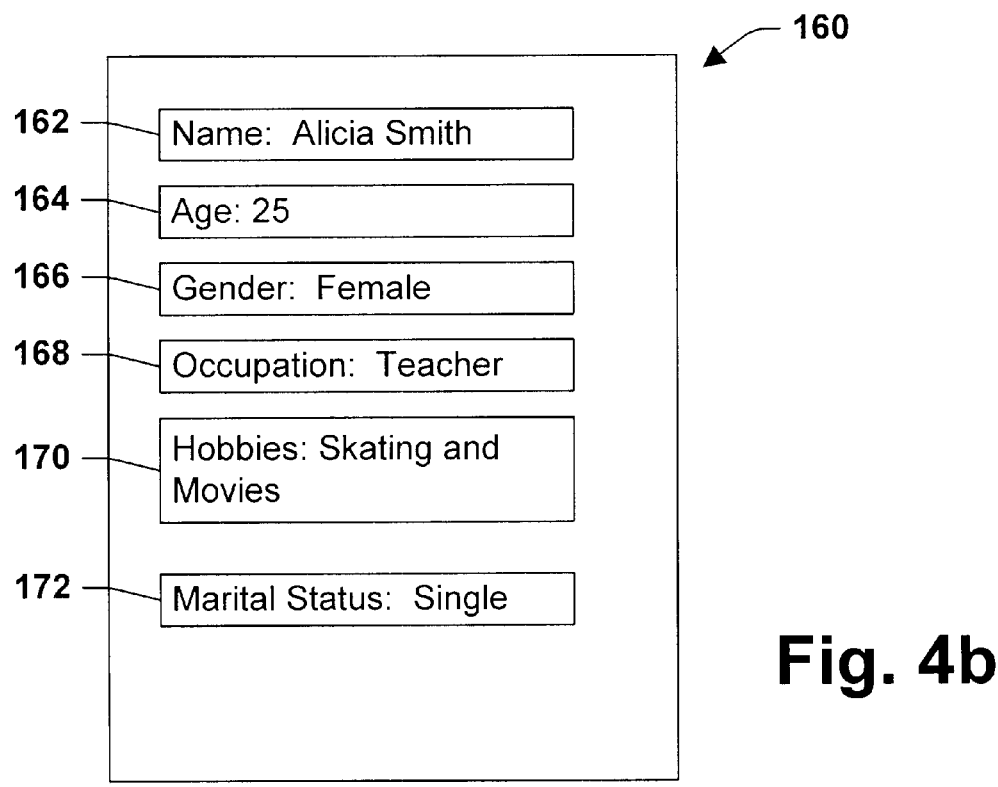
FIG. 4b illustrates a information display screen having information about the user represented by the graphical image pointed to in FIG. 4a in accordance with one aspect of the present invention.

FIGS. 4a–4b illustrate yet another aspect of the invention where a user of the system may be provided with information on other participants in the conferencing session. For example, in FIG. 4a, the user places the mouse pointer over the fifth graphic image 131, which causes an information screen 160 (FIG. 4b) about the participant to be displayed on the user's personal computer. The information screen 160 includes the following information about the participant: name 162; age 164; gender 166; occupation 168; hobbies 170; and marital status 172. It is to be appreciated that the above information is for illustrative purposes only and additional or different information about the participant may be provided. The user can then use this information to decide on whether or not to enter another group. Additionally, this information can be used to begin communication with the participant based on, for example, hobbies of mutual interest or an occupation of interest.

Figure 5:
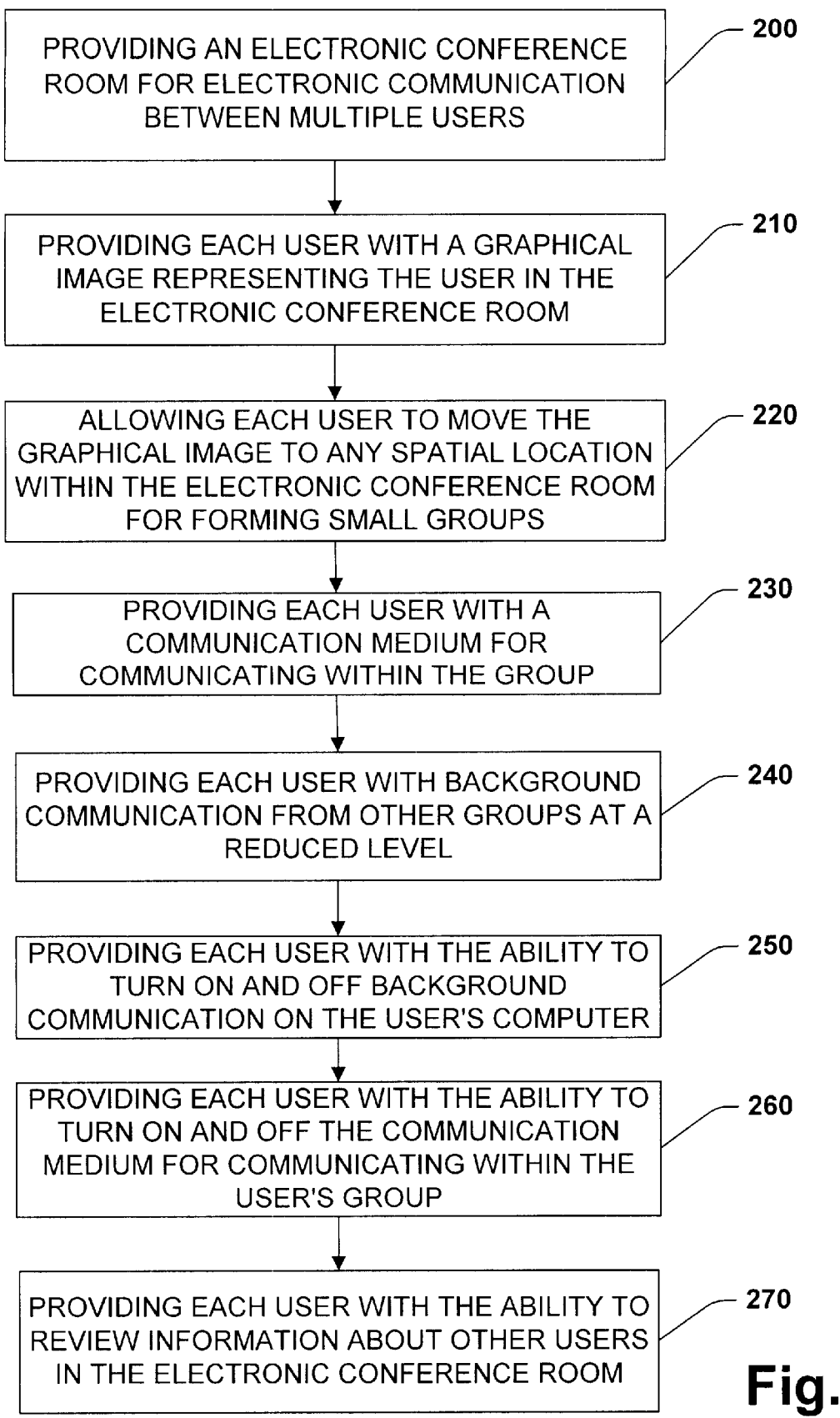
FIG. 5 illustrates a flow chart of one particular methodology of the creation and operation of an electronic conference room in accordance with one aspect of the present invention.

FIG. 5 is a flow diagram illustrating one particular methodology for carrying out the present invention with respect to creation and operation of the electronic conference room 100. In step 200, the server 25 provides an electronic conference room 100 for electronic communication between multiple users. In step 210, the electronic conference room 100 provides each user or client with a graphical image representing that user in the electronic conference room 100. In step 220, the electronic conference room 100 allows each user or client to move the graphical image representing the user or client to any spatial location within the electronic conference room 100 for forming small groups. In step 230, the electronic conference room 100 provides each user with a communication medium for communicating within a group. The electronic conference room 100 then provides each user or client with background communication from other groups at a reduced level in step 240. In step 250, the electronic conference room 100 provides the user with the ability to turn on and off the background communication on the user's computer. In step 260, the electronic conference room 100 provides the user with the ability to turn on and off the communication medium for communicating within the user's group. The electronic conference room 100 then provides the user with the ability to review information about other users in the electronic conference room 100.

The present invention may be implemented via object oriented programming techniques. In this case each component of the system could be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors which the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization. The present invention can employ abstract classes, which are designs of sets of objects that collaborate to carry out a set of responsibilities. Frameworks are essentially groups of interconnected objects and classes that provide a prefabricated structure for a working application.

It is to be appreciated that any programming methodology and/or computer architecture suitable for carrying out the present invention may be employed and are intended to fall within the scope of the hereto appended claims.

The invention has been described with reference to the preferred embodiments. Obviously, modifications and alterations will occur to others upon reading and understanding the preceding detailed description. It is intended that the invention be construed as including all such modifications alterations, and equivalents thereof and is limited only by the scope of the following claims.

What is claimed is:

1. A system for providing an electronic forum for allowing multiple users to communicate simultaneously with one another, the system comprising:

a system interface, a plurality of computers coupled to the system interface;

wherein the system interface provides each user of each of the plurality of computers with an electronic video conference room for communicating with one another, each user being represented by a graphic image in the electronic video conference room, and wherein the system interface allows each user to move about the electronic video conference room, form small groups for communicating, and receive visual background communication including captions from other groups, and wherein the system reduces the size of the captions based on an interface distance between the other groups and the user's respective group.

2. The system of claim 1, wherein the system is adapted to provide an information screen about another user of the system when the user places a mouse pointer using a computer mouse of the computer over the graphical image representing another user, wherein user decisions regarding group formation and communication are based on contents of said information screen.

3. A method for allowing multiple users to communicate electronically with one another, comprising:

providing an electronic video conference room adapted to allow a plurality of computers to be coupled thereto;

providing a plurality of graphical images representing users of the plurality of computers;

allowing each user of the electronic video conference room to move their respective image to different locations within the electronic video conference room and to form small groups;

providing each user with a visual communication medium for communicating with others within their respective group; and providing each user with the ability to receive visual background communication including captions from other groups, wherein the system reduces the size of the captions based on an interface distance between the other groups and the user's respective group.

4. The method of claim 3, further providing each user with the ability to review information sheets of other users by moving a mouse pointer of the user's computer over the graphical image of that particular other user, wherein the user makes group formation and communication decisions based on the information sheets.

5. A system for providing an electronic forum for allowing multiple users to communicate simultaneously with one another, the system comprising:

means for providing an interface;

a plurality of computers coupled to the means for providing an interface;

means for providing each user of the plurality of computers with a graphic image representing the user in an electronic video conference room;

means for allowing each user to move their respective graphic image to form small groups with other graphical images; and means for communicating with other users within the respective small group and for receiving visual background communication including captions from other groups, wherein the interface system reduces the size of the captions based on an interface distance between the other groups and the user's respective group.

* * * * *

UNITED STATES PATENT AND TRADEMARK OFFICE
CERTIFICATE OF CORRECTION

PATENT NO. : 6,559,863 B1
DATED : May 6, 2003
INVENTOR(S) : Nimrod Megiddo

It is certified that error appears in the above-identified patent and that said Letters Patent is hereby corrected as shown below:

<u>Title page,</u>
Item [74], *Attorney, Agent or Firm*, replace "March D. McSwain" with
-- Marc D. McSwain --

Signed and Sealed this

Twenty-sixth Day of August, 2003

JAMES E. ROGAN
*Director of the United States Patent and Trademark Office*